(12) United States Patent
Wolford

(10) Patent No.: US 7,080,181 B2
(45) Date of Patent: Jul. 18, 2006

(54) HOT-PLUGGABLE VIDEO ARCHITECTURE

(75) Inventor: Robert R. Wolford, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 10/461,726

(22) Filed: Jun. 13, 2003

(65) Prior Publication Data

US 2004/0255067 A1    Dec. 16, 2004

(51) Int. Cl.
*G06F 13/12* (2006.01)
*G06F 13/00* (2006.01)

(52) U.S. Cl. .................................... 710/302; 710/64
(58) Field of Classification Search ............... 710/302, 710/64
See application file for complete search history.

(56) References Cited

U.S. PATENT DOCUMENTS

| | | | |
|---|---|---|---|
| 5,796,960 A * | 8/1998 | Bicevskis et al. ........... 345/555 |
| 5,991,831 A | 11/1999 | Lee et al. .................... 710/33 |
| 6,105,089 A | 8/2000 | Chari et al. ................. 710/103 |
| 6,119,178 A | 9/2000 | Martin et al. ................ 710/72 |
| 6,282,596 B1 | 8/2001 | Bealkowski et al. ........ 710/103 |
| 6,282,646 B1 | 8/2001 | Hendry et al. ............. 713/100 |
| 6,356,968 B1 * | 3/2002 | Kishon ........................ 710/306 |
| 6,401,157 B1 * | 6/2002 | Nguyen et al. ............. 710/302 |
| 6,480,373 B1 | 11/2002 | Landry et al. .............. 361/680 |
| 6,483,515 B1 * | 11/2002 | Hanko ........................ 345/545 |
| 6,487,623 B1 | 11/2002 | Emerson et al. ............ 710/302 |
| 6,618,774 B1 * | 9/2003 | Dickens et al. .............. 710/64 |
| 6,765,416 B1 * | 7/2004 | Shih et al. ..................... 327/1 |
| 2002/0116722 A1 * | 8/2002 | Graber et al. ............... 725/143 |
| 2004/0015991 A1 * | 1/2004 | Thornton ..................... 725/74 |
| 2004/0123009 A1 * | 6/2004 | Holley et al. ............... 710/302 |

* cited by examiner

*Primary Examiner*—Rehana Perveen
*Assistant Examiner*—Christopher A. Daley
(74) *Attorney, Agent, or Firm*—Sawyer Law Group LLP

(57) ABSTRACT

A hot-pluggable video architecture system is disclosed. The system includes one or more computers, where each of the computers includes a system bus for carrying signals, such as video bus cycles, a hot-pluggable bus, and a hot-pluggable host controller coupled to the system bus and the hot-pluggable bus. According to the present invention, the hot-pluggable host controller includes a video resource controller for reading and converting the video bus cycles on the system bus into signals having a format of the hot-pluggable bus. An external hot-pluggable video subsystem is further provided that can be removably coupled to the hot-pluggable bus of any one of the computers for processing the signals into a format suitable for a display.

19 Claims, 4 Drawing Sheets

HOT-PLUGGABLE VIDEO ARCHITECTURE

FIELD OF THE INVENTION

The present invention relates to video architectures, and more particularly to a hot-pluggable video architecture for use in distributed computing systems.

BACKGROUND OF THE INVENTION

Every computer system today requires a video subsystem to operate properly and to allow a user to interact with the computer. The same holds true in a distributed computing environments FIG. 1 is a block diagram illustrating a conventional distributed computing system. One example of a distributed computing system 10 is a large server farm that is used to provide some type of "e-utility" over a network or the Internet. The distributed computing system 10 may include tens or hundreds of servers 12a–n, each with its own processor 14, memory 16, a core chip 18, a system bus 20, such as a peripheral component interconnect (PCI) bus, and video subsystem 22. In order for the servers 12 to be accessed remotely by an operator, a switch 24 connects the video subsystems 22 of the servers 12 together so that their video signals can be switched between a single display 26.

The video signals produced by each server 12 are typically sent across a system bus 20 to the video subsystem 22. In operation, the processor 14 sends out video bus cycles, which are initiated by the core chip 18. The core chip 18 converts signals between the processor bus and other system buses in the computer. The video subsystem 22 monitors the PCI bus 20 and reads the signals that have the appropriate addresses. The video subsystem 22 decodes the PCI bus cycles read-off the bus 20, and converts them into signals required for the display 26.

The current video architecture for distributed systems 10 has several disadvantages. First, the video subsystem 22 of each server 12 may sit unused for long periods of time because the operator only needs to monitor one server 12 at a time. Therefore, the video subsystem 22 built into the servers 12 are redundant and increase the cost of not only each server 12, but also the cost of the overall system 10. Second, although the video subsystem 22 of each server 12 sits mostly unused, the processor 14 continues to issue video commands, which consumes bandwidth and degrades overall server performance. In addition, all the redundant video subsystems 22 are additional components that continually consume power and may also malfunction, reducing system reliability.

Accordingly, what is needed is an improved video architecture for use in distributed computing systems. The present invention addresses such a need.

SUMMARY OF THE INVENTION

The present invention provides a hot-pluggable video architecture. The system aspect of the present invention includes one or more computers, where each of the computers includes a system bus for carrying signals, such as video bus cycles, a hot-pluggable bus, and a hot-pluggable host controller coupled to the system bus and the hot-pluggable bus. According to the present invention, the hot-pluggable host controller includes a video resource controller for reading and converting the video bus cycles on the system bus into signals having a format of the hot-pluggable bus. An external hot-pluggable video subsystem is further provided that can be removably coupled to the hot-pluggable bus of any one of the computers for processing the signals into a format suitable for a display.

According to the system and method disclosed herein, the video architecture replaces the individual video subsystems in the computers with a single external video subsystem that is hot-pluggable into the computers. The hot-pluggable video architecture reduces cost because each computer in a multi-computer environment no longer requires its own video subsystem, and increases individual performance of the computers because video bus cycles do not need to be generated when the external video subsystem is not plugged into the computer.

DETAILED DESCRIPTION

The present invention relates to video architectures. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
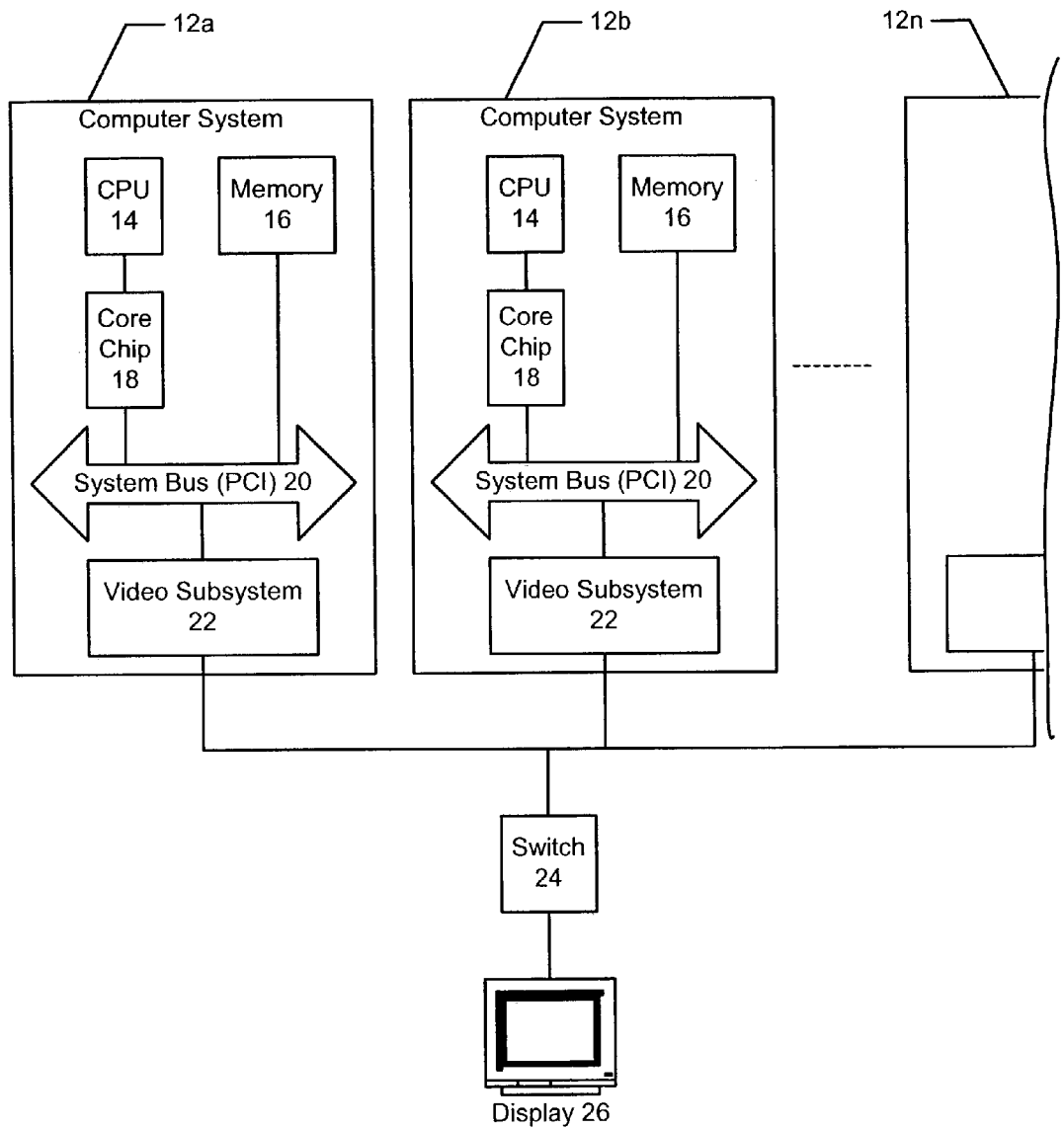
FIG. 1 is a block diagram illustrating a conventional distributed computing system.
Figure 2:
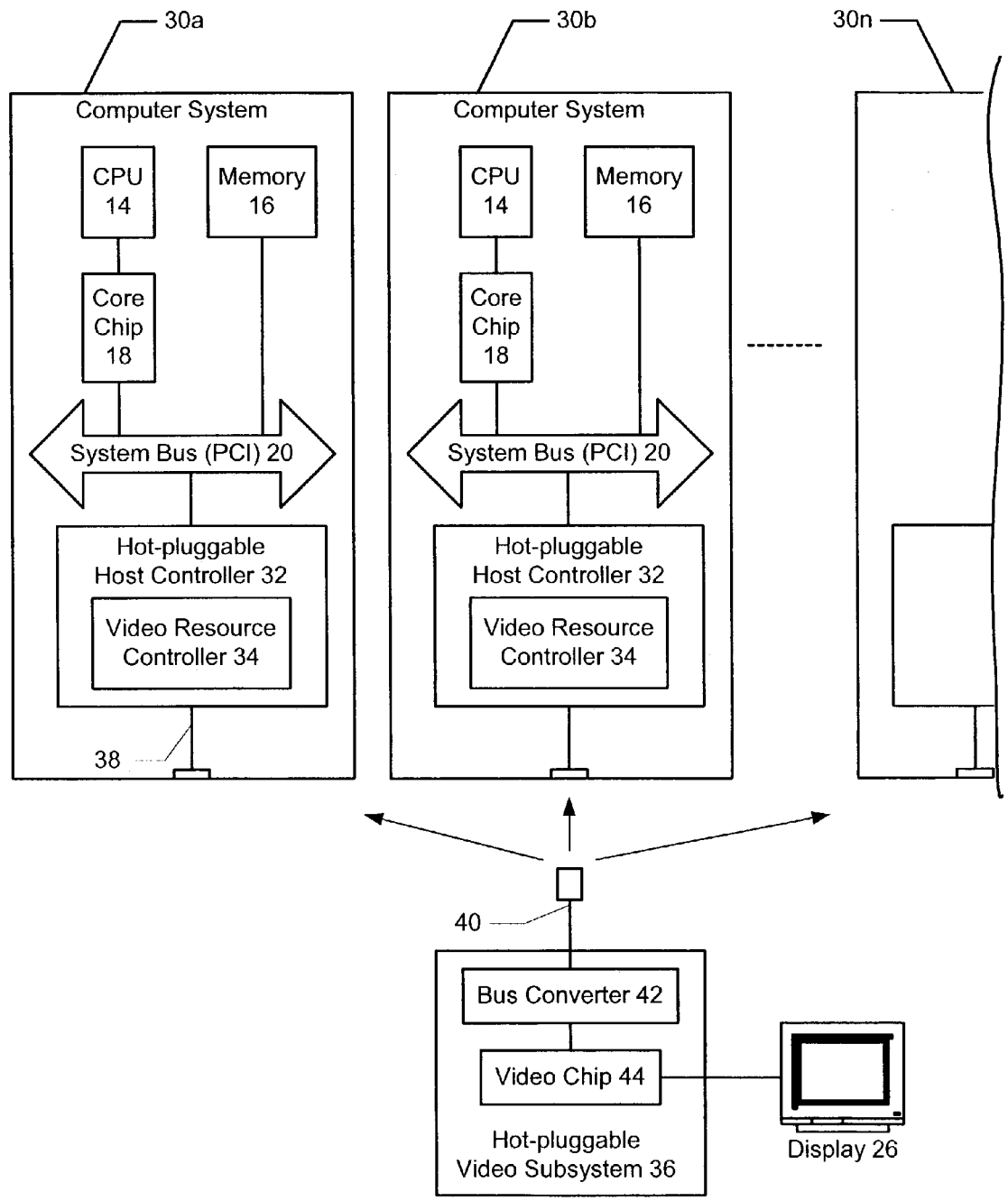
FIG. 2 is a block diagram illustrating a hot-pluggable video architecture in accordance with preferred embodiment of the present invention.

FIG. 2 is a block diagram illustrating a hot-pluggable video architecture 28 in accordance with preferred embodiment of the present invention, where like components from FIG. 1 have like reference numerals. The video architecture 28 enables computer 30 to be designed without a video subsystem to reduce cost. In a multi-computer environment, for example, the multiple video subsystems of the computers 30 are replaced with a single video subsystem 36 that may be hot-plugged into the computers 30 whenever an operator needs to interact with a particular computer 30 in the system.

The video bus cycles sent across PCI bus 20 from the CPU 14 are addressed to a collection of resources, such as I/O regions and memory regions. More specifically, the resources include VGA I/O, VGA memory, video ROM, other memory and I/O regions, and interrupts. Instead of routing these resource signals to a video subsystem connected to the PCI bus 20, the present invention eliminates the video subsystem by adding a video resource controller 34 to an existing host controller 32 of a hot-pluggable bus 38 (e.g. a USB host controller). This enables the hot-pluggable bus controller 32 to read and convert the video bus cycles from PCI format into signals having a format of the hot-pluggable bus 38.

The video architecture further includes a single, external hot-pluggable video subsystem 36 that can be coupled to the hot-pluggable buses 38 of any of the computers 30 via a hot-pluggable cable 40. The hot pluggable video subsystem 36 processes the signals received from the hot pluggable bus 40 into a format suitable for the display 26 to which it is attached.

As is well known to those with ordinary skill in the art, hot-plugging is a feature that allows equipment to be connected to, or disconnected from, an active device while the device is powered on. Although any hot-pluggable bus standard could be used with the present invention, in a preferred embodiment, universal serial bus (USB) and FireWire (IEEE 1394) are preferred in the present architecture because these bus standards are designed as low pin counts, hot-pluggable buses.

In the embodiment where a USB bus is used, the hot-pluggable controller 32 comprises a USB bus controller that is connected to a 1.2 or 2.0 USB bus. In this configuration, the hot-pluggable video subsystem 36 includes a USB-to-PCI converter 42 and a video chip 44. The USB-to-PCI converter 42 converts USB packets from the USB bus 38 back into PCI format and transfers the PCI formatted signals to the video chip 44 for video processing. The video chip 44 then transfers the video signals to the display 26.

In an alternative embodiment, the USB-to-PCI converter 42 could be implemented inside the video chip 44. In a further embodiment, the hot-pluggable video subsystem 36 could be integrated within a flat panel display.

Figure 3A:
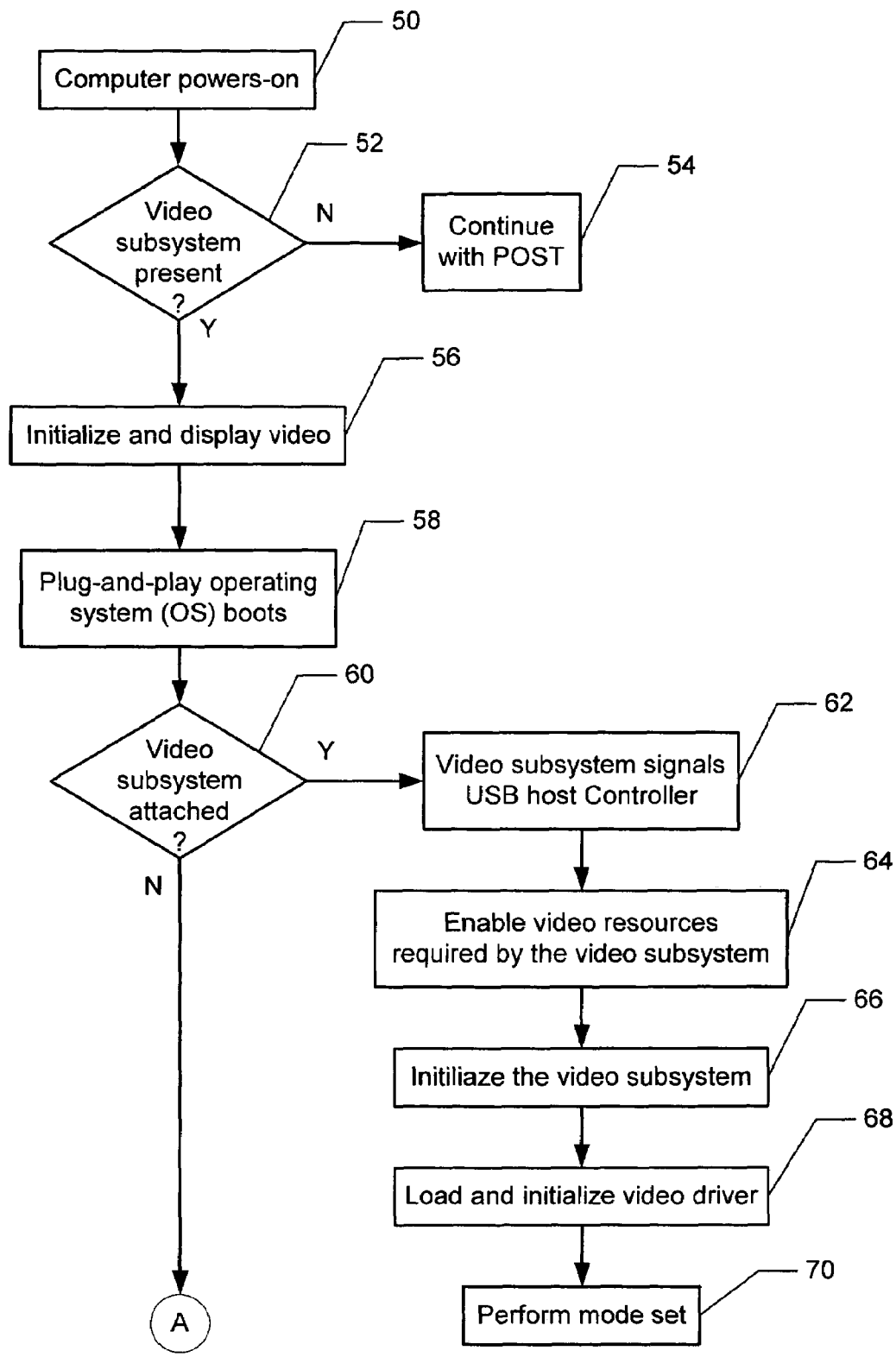
FIGS. 3A and 3B are flow charts illustrating the operation of the hot-pluggable video subsystem in a preferred embodiment of the present invention.
Figure 3B:
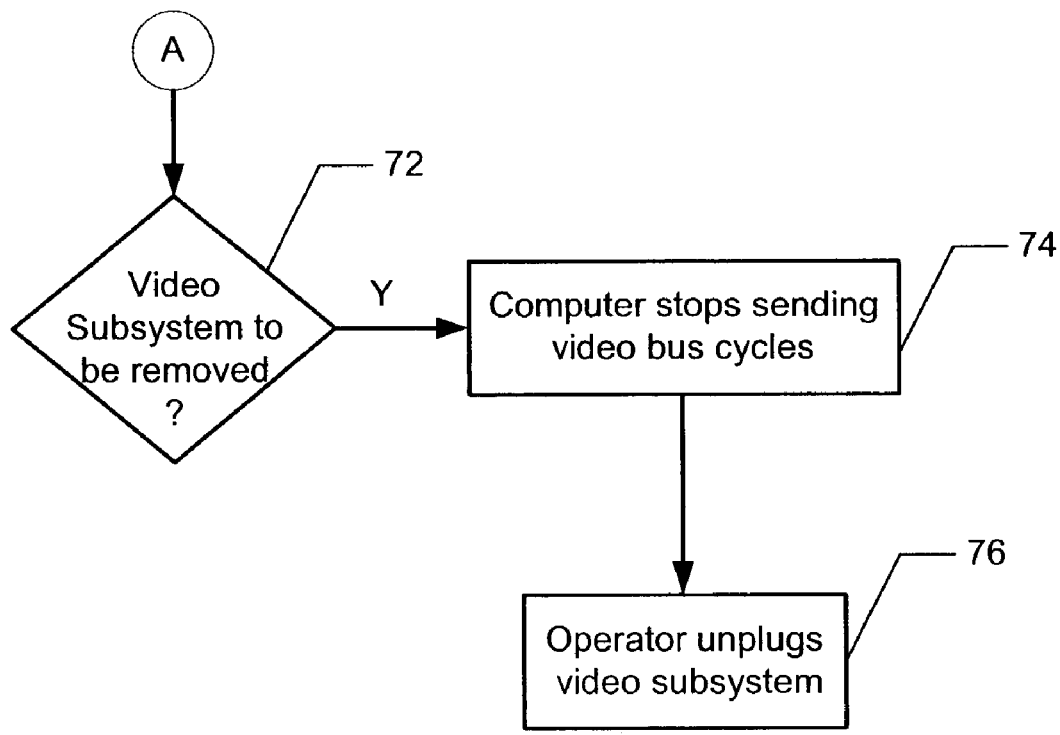

FIGS. 3A and 3B are flow charts illustrating the operation of the hot-pluggable video subsystem in a preferred embodiment of the present invention. The process begins in step 50 when a computer 30 is powered on. In step 51, VGA video resources are reserved, and during power-on system tests (POST) in step 52, the computer 30 checks for the presence of the hot-pluggable video subsystem 36. If the hot-pluggable video device 36 is not present, the computer 30 continues through POST with no video error in step 54. If the hot-pluggable video subsystem 36 is present, then in step 56, the computer 30 initializes and displays video. After POST has completed in step 58, a plug-and-play operating system (OS) boots.

During the OS boot in step 60, the video resource controller 34 in the USB host controller 32 checks to see if a hot-pluggable video subsystem 36 is attached. If the video subsystem 36 is attached, then steps 62 through 70 are performed. In step 62, after power is applied to the video subsystem 36, the video subsystem 36 signals the USB host controller 32 of its presence. In step 64, the video resources required by the video subsystem 36 are enabled. Note, VGA resources are fixed and can be reserved for the video subsystem 36 even before one is attached. The other resources may be dynamically allocated once the video subsystem 36 is attached. These additional resources can typically be determined by reading the PCI configuration registers.

In step 66, the video subsystem 36 is initialized with a video BIOS that resides on the hot-pluggable video subsystem 36. In step 68, a video driver is loaded and initialized. Note, the video driver has already been installed on the computer 30. In step 70, a mode set is performed to reset the display screen and start from a known point. The video subsystem 36 is now attached, initialized, and ready to use.

Referring to FIG. 3B, in step 72, it is determined whether an operator has indicated that the video subsystem 36 is to be removed from the system. In a preferred embodiment, the user indicates a desire to remove the video subsystem 36 by signaling the OS with a program (similar to stopping a hot-pluggable mass storage device). If the user unplugs the video subsystem 36 without notifying the OS first, timeouts will occur on the video cycles and degrade performance until the OS becomes aware that the video device has been removed.

In step 74, the computer 30 stops sending video bus cycles across the PCI bus 20. This reduces system bus traffic and increases in performance. In step 76, the video subsystem 36 is unplugged by the operator, and the dynamic video resources are freed by the OS.

According to the present invention, the video architecture 28 allows an operator to connect an entire video subsystem 36 to each computer 30 in a multi-computer environment, rather than connecting a monitor to the individual video subsystems of each of the computers 30.

The hot-pluggable video architecture described in the present invention has several advantages. One primary advantage is that the video architecture reduces cost because each computer no longer requires its own video subsystem. For example, in a room of 100 servers, none of the servers would require a video subsystem. All they would need is a port where the hot-pluggable video subsystem could be plugged in. The cost savings is scalable and increases with the total number of computers at a particular site. The total costs for the video solution could easily be $\frac{1}{100}$ of what is today.

Another advantage is that the individual performance of the computers would be improved because video commands are only sent to the hot-pluggable video subsystem when it is attached to the computer. This is in contrast to today's servers where commands are sent to a video controller even when the monitor is not being used. Further advantages afforded by the present invention include increased system reliability because each computer has fewer parts to malfunction, and each computer system can be designed smaller due to less components.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A hot-pluggable video architecture, comprising: one or more computers, each computer including,
    a system bus for carrying signals, including video bus cycles,
    a hot-pluggable bus, and
    a hot-pluggable host controller coupled to the system bus and the hot-pluggable bus, the hot-pluggable host controller including a video resource controller for reading and converting the video bus cycles on the system bus into signals having a format of the hot-pluggable bus; and
    an external hot-pluggable video subsystem that can be removably coupled to the hot-pluggable bus of any one of the one or more computers for processing the signals received from the hot pluggable bus into a format suitable for a display,
    wherein each computer stops generating video bus cycles when the external hot-pluggable video subsystem is not connected thereto.

2. The hot-pluggable video architecture of claim 1, wherein the video bus cycles on the system bus are addressed to a collection of resources, including any combination of VGA I/O, VGA memory, video ROM, other memory and I/O regions, and interrupts.

3. The hot-pluggable video architecture of claim 2 wherein the hot-pluggable bus complies with an IEEE 1394 standard.

4. The hot-pluggable video architecture of claim 2, wherein the hot-pluggable bus complies with a universal serial bus (USB) standard.

5. The hot-pluggable video architecture of claim 4, wherein the hot-pluggable controller comprises a USB bus controller that is connected to a USB bus.

6. The hot-pluggable video architecture of claim 5, wherein the system bus comprises a PCI bus, and the hot-pluggable video subsystem further includes a USB-to-PCI converter and a video chip, wherein the USB-to-PCI converter converts USB packets from the USB bus into PCI format and transfers the PCI formatted signals to the video chip for video processing and transfer to the display.

7. The hot-pluggable video architecture of claim 6, wherein the USB-to PCI converter is implemented inside the video chip.

8. The hot-pluggable video architecture of claim 6, wherein the hot-pluggable video subsystem is integrated within a flat panel display.

9. The hot-pluggable video architecture of claim 6, wherein once it has been determined that the hot-pluggable video subsystem has been unplugged from a given computer, the given computer stops sending video bus cycles across the PCI bus.

10. A method for providing a hot-pluggable video architecture, the method comprising the steps of:
 (a) adding a video resource controller to a hot-pluggable host controller in one or more computers for decoding video resource signals from a corresponding system bus within each computer;
 (b) providing an external hot-pluggable video subsystem that couples to the hot-pluggable host controller of processing the video resource signals from the hot-pluggable host controller into a format required for a display, thereby allowing the external hot-pluggable video subsystem to be plugged into any one of the one or more computers for monitoring on the display without requiring the one or more computers to include an internal video subsystem; and
 (c) determining that the hot-pluggable video subsystem has been unplugged from a given computer, and if so then the given computer stops generating video bus cycles.

11. The method of claim 10, wherein the video resource signals include any combination of VGA I/O, VGA memory, video ROM, other memory and I/O regions, and interrupts.

12. The method of claim 11, wherein the video resource controller is coupled to a hot-pluggable bus and converts the video resource signals into a format of the hot-pluggable bus.

13. The method of claim 12, wherein the hot-pluggable bus complies with an IEEE 1394 standard.

14. The method of claim 12, wherein the hot-pluggable bus complies with a universal serial bus (USB) standard.

15. The method of claim 14, wherein the hot-pluggable controller comprises a USB bus controller that is connected to a USB bus.

16. The method of claim 15, wherein the system bus comprises a PCI bus, and the hot-pluggable video subsystem further includes a USB-to-PCI converter and a video chip, wherein the USB-to-PCI converter converts USB packets from the USB bus into PCI format and transfers the PCI formatted signals to the video chip for video processing and transfer to the display.

17. The method of claim 16, wherein the USB-to-PCI converter is implemented inside the video chip.

18. The method of claim 16, wherein the hot-pluggable video subsystem is integrated within a flat panel display.

19. The method of claim 16, wherein once it has been determined that the hot-pluggable video subsystem has been unplugged from a given computer, the given computer stops sending video bus cycles across the PCI bus.

\* \* \* \* \*